(12) United States Patent
Pasquarelli et al.

(10) Patent No.: US 12,344,163 B2
(45) Date of Patent: Jul. 1, 2025

(54) VEHICLE WINDOW WITH LIGHTING UNIT

(71) Applicant: Webasto SE, Stockdorf (DE)

(72) Inventors: Robert Pasquarelli, Stockdorf (DE); Thomas Weiderer, Stockdorf (DE); Stefan Groitl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/746,197

(22) Filed: Jun. 18, 2024

(65) Prior Publication Data
US 2024/0424984 A1    Dec. 26, 2024

(30) Foreign Application Priority Data
Jun. 23, 2023   (DE) .................... 10 2023 116 605.0

(51) Int. Cl.
*B60Q 3/208*   (2017.01)
*B60Q 3/62*    (2017.01)
*F21V 8/00*    (2006.01)

(52) U.S. Cl.
CPC ............ *B60Q 3/208* (2017.02); *B60Q 3/62* (2017.02); *G02B 6/0023* (2013.01)

(58) Field of Classification Search
CPC ......... B60Q 3/208; B60Q 3/62; G02B 6/0023
USPC ................................................ 362/511, 493
See application file for complete search history.

(56) References Cited

U.S. PATENT DOCUMENTS

| | | | |
|---|---|---|---|
| 2018/0001751 A1* | 1/2018 | Thannheimer | G02B 6/0046 |
| 2023/0053295 A1* | 2/2023 | Jiang | G02B 6/0091 |
| 2023/0118480 A1* | 4/2023 | Pasquarelli | B32B 17/10541 296/215 |
| 2024/0109482 A1* | 4/2024 | de Bie | B32B 17/10541 |
| 2024/0308309 A1* | 9/2024 | Nellen | B60J 1/001 |

FOREIGN PATENT DOCUMENTS

| | | |
|---|---|---|
| DE | 102020213689 B4 | 7/2022 |
| WO | 2021198262 A1 | 10/2021 |

OTHER PUBLICATIONS

Machine Translation of WO2021198262A1, Oct. 18, 2024, 15 pages. (Year: 2024).*
Office Action issued against corresponding German Application No. 10 2023 116 605.0; mailed Jan. 30, 2024; In German with English Machine Translation ( 14 pages).

* cited by examiner

*Primary Examiner* — Laura K Tso
(74) *Attorney, Agent, or Firm* — Fitch, Even, Tabin & Flannery, LLP

(57) ABSTRACT

A vehicle window arrangement has an outer face facing a vehicle environment and an inner face facing a vehicle interior and being parallel to the outer face. A light-conducting layer forms the inner face. The vehicle window has a lighting unit and at least one light input unit having at least one light input element is disposed on the inner face which couples light emitted by the lighting unit, via a coupling surface opposite the inner face into the light-conducting layer. The light input unit is provided with at least one light-conductor on a coupling side of the at least one light input element which conducts light emitted by the lighting unit from a first light-conducting zone, which corresponds to a position of the lighting unit, to a second light-conducting zone, which is offset relative to the first light-conducting zone in the direction of the window body arrangement.

11 Claims, 3 Drawing Sheets

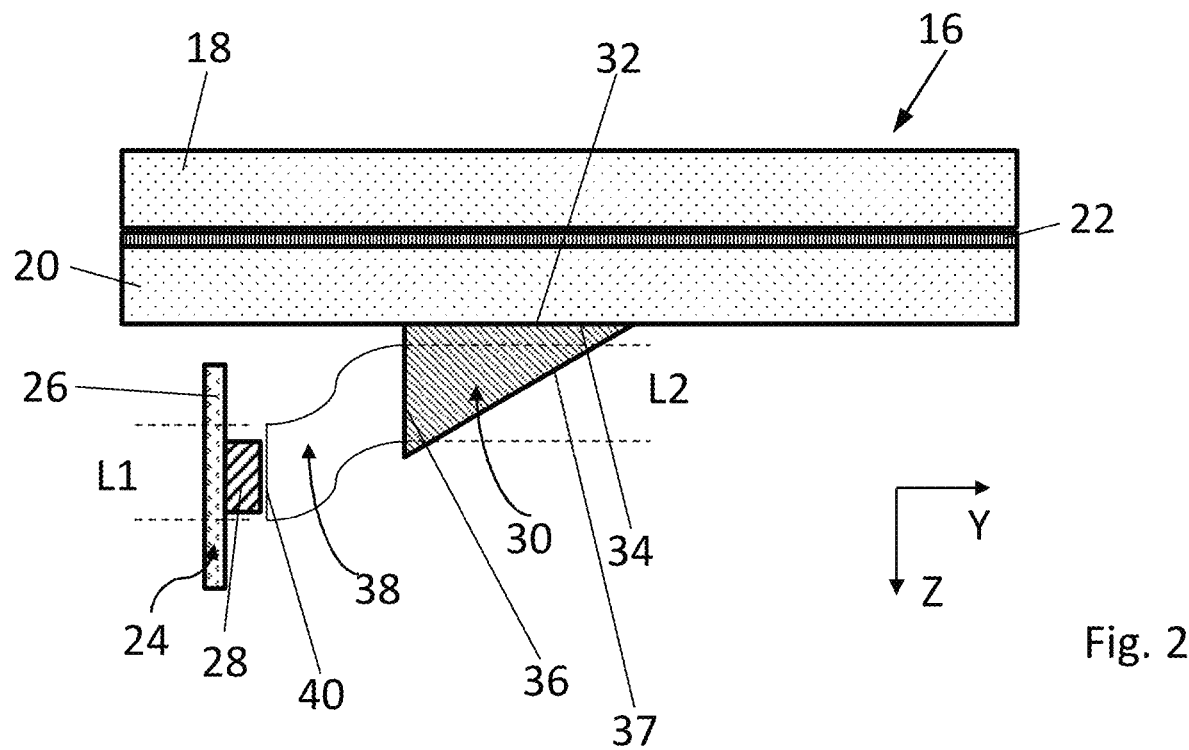
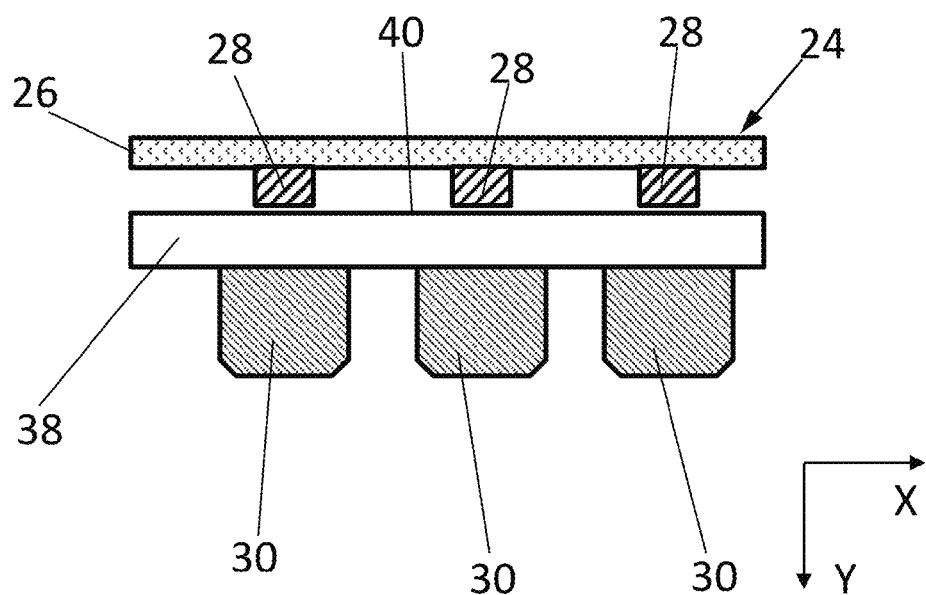
Fig. 2
Fig. 3

VEHICLE WINDOW WITH LIGHTING UNIT

CROSS-REFERENCE TO RELATED APPLICATION(S)

This application claims the benefit of German patent application no. 10 2023 116 605.0 filed on Jun. 23, 2023, which is incorporated herein by reference in its entirety.

TECHNICAL FIELD

This disclosure relates generally to a vehicle window.

BACKGROUND

A vehicle window of this kind is known from patent document WO 2021/198262 A1 and is part of a vehicle roof in the form of a lid element of a roof opening system or a fixed roof element. The known vehicle window comprises a window body arrangement, which is configured as a sandwich structure and which comprises a light-conducting layer on which a rail-shaped light input element is attached. Additionally, the vehicle window comprises a lighting unit, which is connected to the light input element so that light, which is emitted by the lighting unit, is redirected in the light input element and coupled into the light-conducting layer. In this way, an illuminated area can be realized on the light-conducting layer, which forms the visible surface of the vehicle window accessible from a vehicle interior.

SUMMARY

The object of the disclosure is to provide a vehicle window of the kind described above by means of which the light emitted by the lighting unit can be coupled into the light input unit in an optimized manner.

According to the disclosure, this object is attained by the vehicle window having the features of claim 1.

The disclosure proposes a vehicle window comprising a window body arrangement, which has an outer face facing a vehicle environment and an inner face facing a vehicle interior and being in particular parallel to the outer face and which comprises a light-conducting layer forming the inner face, said vehicle window furthermore comprising a lighting unit and at least one light input unit having at least one light input element, which is disposed on the inner face of the window body arrangement and which couples light, which is emitted by the lighting unit, via a coupling surface opposite the inner face of the window body arrangement into the light-conducting layer. To achieve an optimized coupling of the light into the light input unit, the light input unit is provided with at least one light-conducting means, which is disposed on a coupling side of the at least one light input element and which conducts light emitted by the lighting unit from a first light-conducting zone, which corresponds to a position of the lighting unit, to a second light-conducting zone, which is offset relative to the first light-conducting zone in the direction of the window body arrangement. Therefore, the light-conducting means causes the light to be transferred from a first plane to another or to a second plane, which is closer to the window body arrangement than the first plane, so that the light can be coupled into the light-conducting layer at least largely without loss by means of the coupling unit, said light-conducting layer being part of the window body arrangement. In particular, the offset is at right angles to the plane of the window body arrangement. A geometry-related position of the lighting unit that is offset at least approximately at right angles to the inner face or inner surface of the window body arrangement in relation to the light input unit, which, in particular in relation to the coupling unit, is arranged closer to the edge of the vehicle window and which is arranged to the side of the coupling unit when projected onto the window body arrangement, can thus be compensated.

In principle, the window body arrangement of the vehicle window according to the invention can be designed as a composite structure, in particular as laminated safety glass, or as a single pane glass or a single pane safety glass.

When a composite structure is used as a window body arrangement, it preferably has an outer window body and an inner window body, which is connected to the outer window body via at least one connecting layer. In this case, the inner window body preferably forms the light-conducting layer. The light input element of the light input unit is preferably disposed directly on the inner face of the inner window body, which may be formed by a continuous coating or a coating that is interrupted in the area of the light input element, said inner face forming a large surface of the window body arrangement. An additional, possibly cost-intensive light-conducting layer is not required. When the lighting unit is activated, the inner window body can provide a planar or pattern-like ambient light function.

In the case of laminated glass with an outer window body and an inner window body, it is also conceivable to attach an additional light-conducting layer, into which the light from the lighting unit can be coupled by means of the light input unit, to the inner face of the inner window body.

In principle, the inner window body of a composite structure used as a light conductor can be made of any material that can be used for this purpose. For example, the inner window body is made of a material comprising glass and/or a polycarbonate material and/or another plastic material.

In a specific embodiment of the vehicle window according to the invention, the light input unit comprises a plurality of light input elements arranged in series side by side or one behind the other, which are arranged on the inner face formed by the light-conducting layer, said inner face being aligned in particular plane-parallel to the outer face of the window body arrangement. In this case, the lighting unit preferably comprises a corresponding number of light sources or LEDs, which can be disposed on a shared carrier board.

In an advantageous embodiment of a vehicle window according to the invention used as a roof window, a light input unit having at least one light input element is disposed on one edge of the window body arrangement or alternatively on two edges of the window body arrangement facing away from each other, in each case close to the edge. The two light input units are provided with one lighting unit each, which can comprise a plurality of light sources. Rows of several light input elements disposed next to each other can also be arranged on the two sides or on the two edges of the vehicle window, each light input element being assigned at least one light source of the lighting unit. Furthermore, it is also conceivable to provide a light input unit along each of the four edges of a vehicle window having an essentially rectangular base surface according to the invention, said light input unit having at least one light input element with which at least one lighting unit is associated according to the invention.

The light input element of the vehicle window according to the invention is preferably designed such for optimized coupling in of the light emitted by the lighting unit that it has at least one wedge surface which is formed by a boundary surface of the light input element facing away from the window body arrangement and which runs at an angle or is inclined relative to the coupling surface, which is disposed opposite of or which abuts against the inner face of the window body arrangement, and relative to the inner face of the window body arrangement so that boundary surface and the inner face of the window body arrangement enclose an acute angle.

The light input element is preferably configured as a plastic body which is in particular made of a material comprising PMMA (poly (methyl methacrylate)), PC (polycarbonate), PA (polyamide), COC (cyclic olefin copolymers) or COP (cyclic olefin polymers). It is also conceivable that the light input element is a glass element.

In a preferred embodiment of the vehicle window according to the invention, the light-conducting means, by means of which the light to be couple in is transferred from the first to the second light-conducting zone, is made of the material from which the light input element is also made so that the two have the same indexes of refraction. If the materials of the light-conducting means and the light input unit are different, the indexes of refraction of these materials should differ only slightly.

In a preferred embodiment according to the invention, the light-conducting means of the vehicle window according to the invention, by means of which the light is transferred from the first light-conducting zone to the second light-conducting zone, has an S-shaped cross section. When viewed in section, it is therefore curved in two opposite directions between the lighting unit and the light input unit so that the light which is emitted by the lighting unit and which is coupled into the light-conducting means via a coupling surface, is guided into the second light-conducting zone, which corresponds to the light input unit, with as little loss as possible.

In one embodiment, the light-conducting element can have an optical element on the lateral surface facing the LED. The optical element can be a lens. For example, this lens can be realized as a convex lateral surface. Alternatively or additionally, the lateral surface can have a surface structure, for example with a grid structure or with a roughening. The light input element and/or the light-conducting means can have a reflective coating or cover, for example comprising aluminum.

In an embodiment of the vehicle window according to the invention that is easy to implement in terms of design, the light-conducting means is formed from a separate light-conducting element that abuts against a lateral surface of the light input element. The light-conducting means is therefore a separate component that is disposed between the lighting unit and the light input unit and preferably abuts against the light input element without an air gap, for example via an adhesive.

The light-conducting means or the separate light-conducting element is in particular bar-shaped and preferably formed in one piece, so that it can extend along a respective edge of the window body arrangement. The bar-shaped design makes it possible for the light-conducting means to be assigned to several light input elements or to abut against several light input elements and to guide the light emitted by a respective light source of the lighting unit into the assigned light input element in a defined manner.

In an alternative embodiment of the vehicle window according to the invention, the light-conducting means is formed integrally with the light input element, so that it is an integral part of the light input element. In this case, the light-conducting means forms in particular a lateral extension of the light input element, said lateral extension being provided with a coupling surface via which the light of the lighting unit is initially coupled into the light-conducting means and guided by said light-conducting means from the first light-conducting zone into the second light-conducting zone and into a coupling section of the light input element, so that it is coupled into the light-conducting layer of the window body arrangement via the coupling surface through corresponding internal reflection.

As already described above, the lighting unit can comprise a carrier board on which at least two light sources are disposed, which are preferably assigned to one light input element of the light input unit each and which can each be configured in particular as LEDs. The lighting unit can be connected to the window body arrangement via the carrier board.

The light sources of the lighting unit are preferably so-called top LEDs, i.e., formed from LEDs whose light is emitted essentially at a right angle to the plane of the carrier board. It is also conceivable that so-called side LEDs are used whose light is emitted essentially parallel to a carrier board, which is then disposed on the window body arrangement in an optimized manner.

In general, the vehicle window according to the invention can be disposed on any position of a motor vehicle. Preferably, however, the vehicle window according to the invention is a roof window, which forms either a fixed roof element which is rigid and disposed so as to be immovable relative to the vehicle body or a moveable lid element of a roof opening system.

The invention also relates to a vehicle roof which comprises a vehicle window of the kind mentioned above.

Further advantages and advantageous embodiments of the subject matter of the invention can be gathered from the description, the drawing and the patent claims. The invention relates to all combinations comprising at least two features disclosed in the description, the claims and/or the figures, i.e., each feature mentioned in the description can in itself be part of the claimed subject-matter independently of the further features or concretizations mentioned in the respective context.

Embodiments of a vehicle window according to the invention are illustrated schematically simplified in the drawing and are described in more detail in the following description.

BRIEF DESCRIPTION OF DRAWINGS

FIG. 2 shows a cut through the vehicle window according to FIG. 1 along line II-II in

FIG. 1;

FIG. 3 shows a top view of a lighting unit and a coupling unit of the vehicle window;

DETAILED DESCRIPTION

Figure 1:
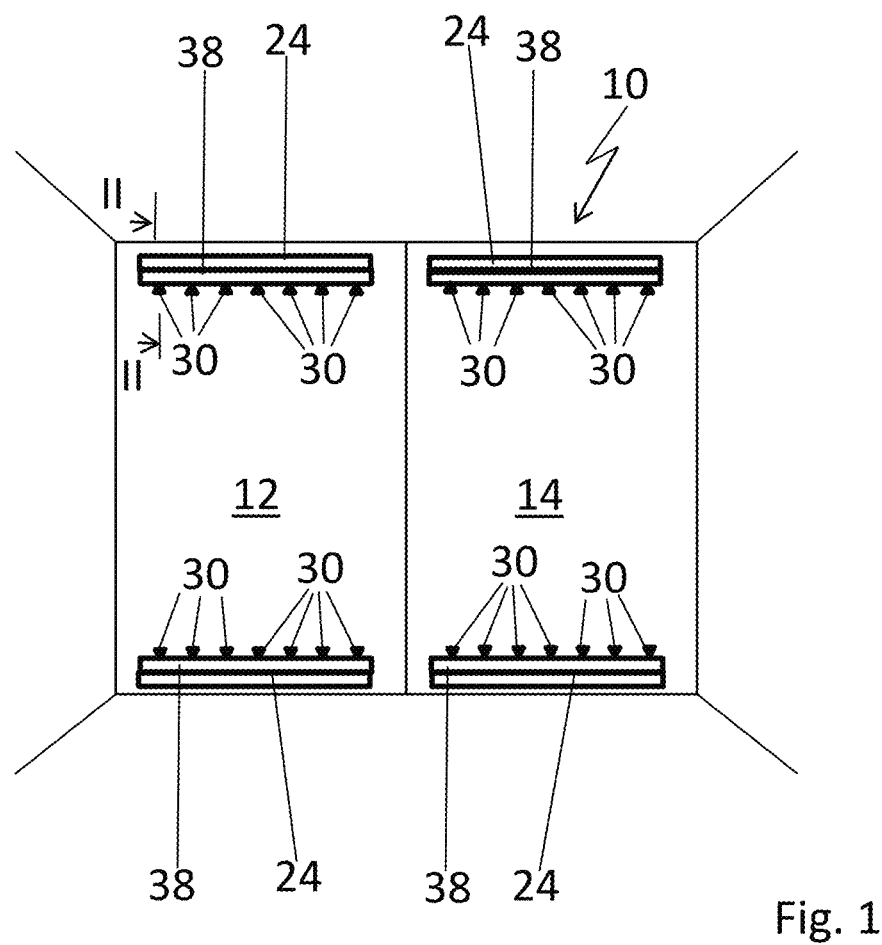
FIG. 1 shows a top view of a vehicle roof having a vehicle window according to the invention.

FIG. 1 shows a vehicle roof 10 of a motor vehicle (not shown) which is configured as a panoramic roof, which has a displaceable lid element 12 and a fixed roof element 14, which is fixed or immovable relative to the vehicle body. Lid element 12, which is part of a roof opening system, and the fixed roof element 14 comprise one glass component each, which forms a vehicle window and which is provided with a so-called ambient light functionality. The basic structure of the vehicle windows of lid element 12 and fixed roof element 14 is the same in the present case and schematically shown by means of FIGS. 2 and 3.

The vehicle windows of lid element 12 and fixed roof element 14 comprise, as can be seen in FIG. 2, one window body arrangement 16 each, which is designed as laminated glass and which has an outer window body 18, which faces a vehicle environment, and an inner window body 20, which faces a vehicle interior and which is connected to outer window body 18 via a connecting layer 22, which can be a lamination film. A liquid crystal arrangement, which can have multiple layers and which forms an electronically switchable shading device of the vehicle window, can possibly also be disposed between outer window body 18 and inner window body 20.

The window body arrangement can have further layers and coatings, such as an imprint, a tinted film, a coating which reflects infrared rays and/or a coating which reflects heat rays (so-called low-E coating).

Outer window body 18 is made of an outwardly curved glass plate, which can be a tinted soda-lime glass, for example, or a curved plastic element, which is made of a polycarbonate material, for example. The in particular outwardly curved inner window body 20 can also be made of an organic glass, such as a soda-lime glass, or a plastic material, such as a polycarbonate material.

Inner window body 18 forms an outer face or outer surface of window body arrangement 16, whereas inner window body 20 forms an inner face or inner surface of window body arrangement 16 parallel to the outer face.

The vehicle window of lid element 12 and the vehicle window of fixed roof element 14 comprise two lighting units 24 each, which extend in the longitudinal direction of the vehicle and which are disposed on a respective side edge of lid element 12 or of fixed roof element 14. The longitudinal direction of the vehicle is the direction that extends from the front of the vehicle towards the rear of the vehicle when the vehicle window is installed on the vehicle in question.

Lighting units 24 are both configured as PCB printed circuit boards and comprise an in particular flexible circuit board 26, on which electronic components are disposed and on which a plurality of LEDs 28 are disposed as light sources in a row one behind the other in the longitudinal direction. To be able to couple the light emitted by LEDs 28 into inner window body 20 representing a light-conducting layer, several light input elements 30, which are wedge-shaped in cross section, are disposed in series one behind the other on the inner face of window body arrangement 16, said light input elements 30 together forming a light input unit and being connected to the inner face of inner window body 20 via an adhesive layer 32. The surfaces of light input elements 30 facing inner window body 20 each form one coupling surface 34, which is oriented parallel to the inner face of window body arrangement 16.

Light input elements 30 have a lateral surface 36 which is oriented essentially at a right angle to the plane of window body arrangement 16 and which forms a coupling surface of respective light input element 30, and said light input elements 30 have a wedge surface 37, which forms an acute angle with coupling surface 34.

Between lateral surfaces 36 of light input elements 30 and LEDs 28 of lighting unit 24, a light-conducting means 38 is disposed, which is formed as a separate component or a light-conducting element and which extends in a rail-shaped manner in the longitudinal roof direction. A coupling side of light-conducting means 38, which is made of the same plastic material as light input elements 30, is directly adjacent to lateral surfaces 36 of several light input elements 30 and is rigidly connected to them, for example via an adhesive surface. In the present case, light-conducting means 38 extends over all light input elements 30 which are disposed on a side of the respective vehicle window. It is also conceivable that several light-conducting means, which are assigned to one light input element and/or one part of the light input elements each, are provided on the respective edges of the vehicle windows.

As can be seen in FIG. 2, each light-conducting means 38 has an S-shaped cross section in the broadest sense, i.e., a cross section following two opposite curvatures, an end-face coupling surface 40, which is adjacent to LEDs 28, being formed in each case. Coupling surface 40 has a height which defines a first light-conducting zone L1, which is located in the area of LEDs 28, which are disposed on circuit board 26. The height of the end face which faces away from coupling surface 40 and which is adjacent to lateral surface 36 of light input elements 30, defines a second light-conducting zone L2.

Because of the geometry of light-conducting means 38, light emitted by LEDs 28 to coupling surfaces 40 is transferred in light-conducting means 38 from light-conducting zone L1 to light-conducting zone L2, which is disposed at an offset in the direction of window body arrangement 16 relative to first light-conducting zone L1, so that the light transferred through light-conducting means 38 is coupled into light input elements 30 in a positionally accurate manner. By means of those, the light is then coupled into inner window body 18, where it can propagate, via coupling surface 34. A decoupling from inner window body 18 to generate an illuminated area and/or light patterns can be realized by corresponding decoupling structures, which are formed, for example, by printing on the surface of inner window body 20 facing outer window body 18.

Figure 4:
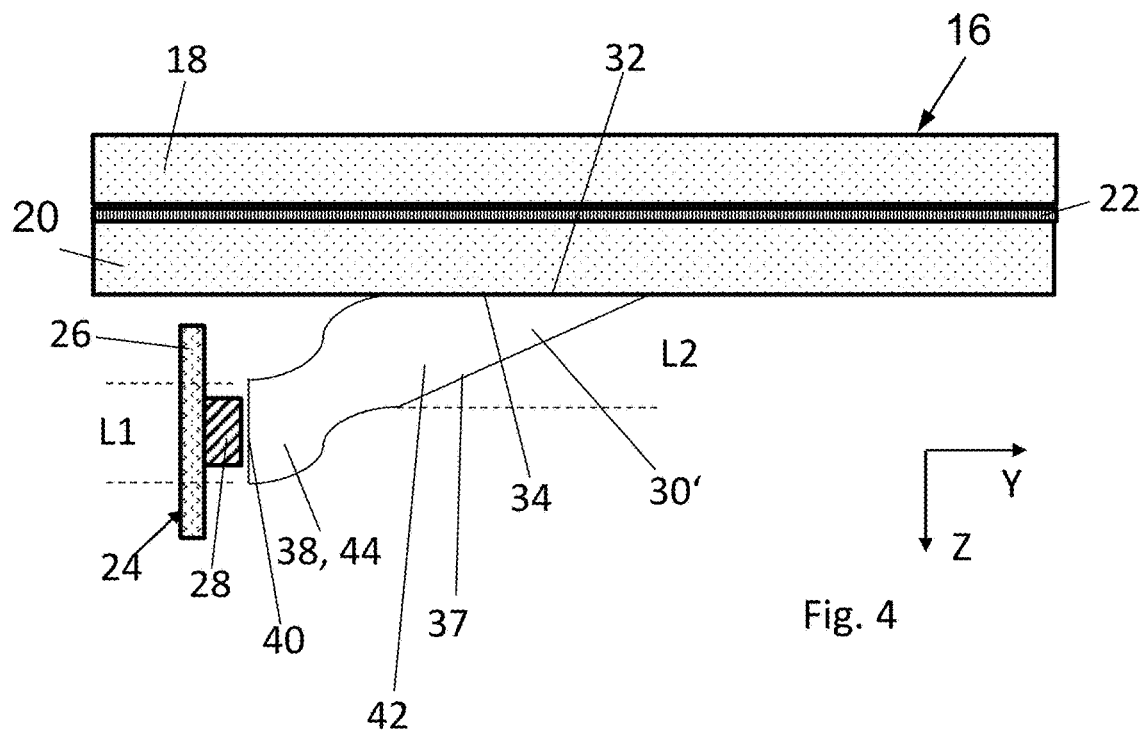
FIG. 4 shows a cut corresponding to FIG. 2 through an alternative embodiment of a vehicle window.
Figure 5:
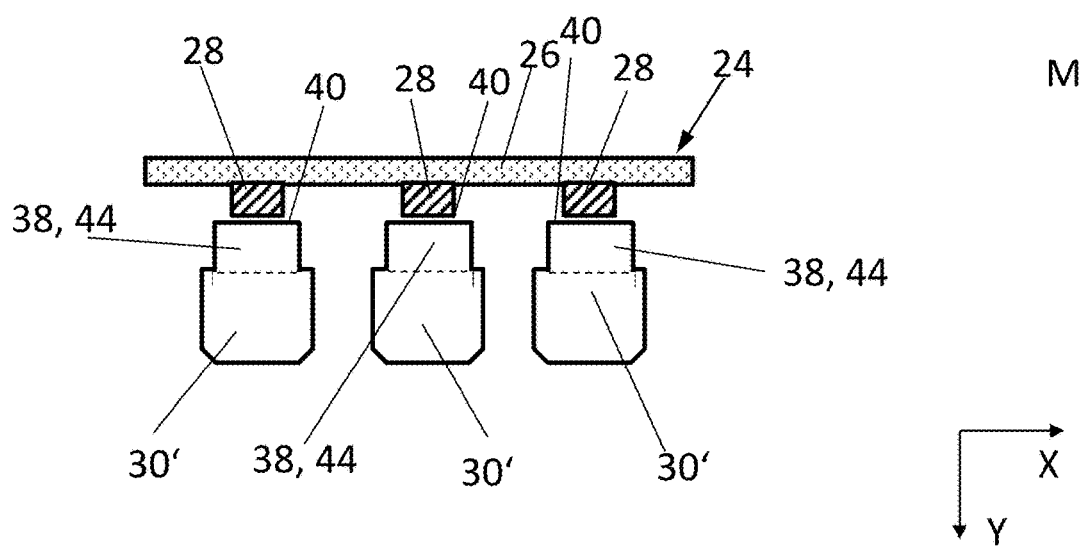
FIG. 5 shows a top view of a lighting unit and a coupling unit of the vehicle window according to FIG. 4.

FIGS. 4 and 5 show an alternative embodiment of a vehicle window, which is essentially designed according to the vehicle windows shown in FIG. 1 and which can also represent a moveable lid element of a roof opening system or a fixed roof element of a vehicle roof.

The vehicle window shown in FIGS. 4 and 5 largely corresponds to the vehicle window described above, but differs from it in that several light input elements 30', which are also fixed to the inner face of inner window body 20 via an adhesive surface 32, are disposed in series one behind the other on the two edges extending in the longitudinal direction of the vehicle. In an integrated and integral manner, each light input element 30' has a wedge-shaped coupling section 42 and, on one coupling side, an extension 44 which adjoins laterally in the direction of respective lighting unit 24 and which represents a corresponding light-conducting means 38, which, according to the embodiment shown in FIGS. 2 and 3, has an S-shaped cross section, at least in the broadest sense. By means of light-conducting means 38, which each has a coupling surface 40 opposite lighting unit 24, light emitted by LEDs 28 is conducted from a light-conducting zone L1 which is located in the area of LEDs 28 and which is defined by the height of coupling surface 40, into a light-conducting zone L2, which is located in the area of coupling section 42 and whose height is defined by the height of coupling section 42 of light input element 30'. Within coupling section 42, an inner reflection of the light occurs in particular on wedge surface 37, so that it can be coupled into inner window body 18 in an optimized manner.

The transition between light-conducting means 38 and coupling surface 40 is approximately located in the area of the edge of adhesive surface 32, which faces lighting unit 24.

In addition, the vehicle window according to FIGS. 4 and 5 corresponds to the one according to FIGS. 1 to 3, which is why reference is made to the description relating thereto in order to avoid repetition.

LIST OF REFERENCE SIGNS 10 vehicle roof
12 lid element
14 fixed roof element
16 window body arrangement
18 outer window body
20 inner window body
22 connecting layer
24 lighting unit
26 circuit board
28 LED
30, 30' light input element
32 adhesive surface
34 coupling surface
36 lateral surface
37 wedge surface
38 light-conducting means
40 coupling surface
42 coupling section
44 extension
L1 light-conducting zone
L2 light-conducting zone

The invention claimed is:

1. A vehicle window comprising:
a window body arrangement having an outer face facing a vehicle environment and an inner face facing a vehicle interior and being parallel to the outer face and which comprises a light-conducting layer forming the inner face, said vehicle window comprising a lighting unit and at least one light input unit having at least one light input element, which is disposed on the inner face of the window body arrangement and which couples light, which is emitted by the lighting unit, via a coupling surface opposite the inner face of the window body arrangement into the light-conducting layer,
wherein the light input unit is provided with at least one light-conducting means, which is disposed on a coupling side of the at least one light input element and which conducts light emitted by the lighting unit from a first light-conducting zone, which corresponds to a position of the lighting unit, to a second light-conducting zone, which is offset relative to the first light-conducting zone in the direction of the window body arrangement.

2. A vehicle window comprising:
a window body arrangement having an outer face facing a vehicle environment and an inner face facing a vehicle interior and being parallel to the outer face and which comprises a light-conducting layer forming the inner face, said vehicle window comprising a lighting unit and at least one light input unit having at least one light input element, which is disposed on the inner face of the window body arrangement and which couples light, which is emitted by the lighting unit, via a coupling surface opposite the inner face of the window body arrangement into the light-conducting layer,
wherein the light input unit is provided with at least one light-conducting means, which is disposed on a coupling side of the at least one light input element and which conducts light emitted by the lighting unit from a first light-conducting zone, which corresponds to a position of the lighting unit, to a second light-conducting zone, which is offset relative to the first light-conducting zone in the direction of the window body arrangement, and
wherein the light-conducting means has an S-shaped cross section and a coupling surface via which the light of the lighting unit is coupled into the light-conducting means.

3. The vehicle window according to claim 1, wherein the light-conducting means is formed from at least one separate light-conducting element which abuts against a lateral surface of the light input element.

4. The vehicle window according to claim 1, wherein the light-conducting means is formed integrally with the light input element, so that it is an integral part of the light input element.

5. The vehicle window according to claim 1, wherein the light-conducting means is bar-shaped.

6. A vehicle window comprising:
a window body arrangement having an outer face facing a vehicle environment and an inner face facing a vehicle interior and being parallel to the outer face and which comprises a light-conducting layer forming the inner face, said vehicle window comprising a lighting unit and at least one light input unit having at least one light input element, which is disposed on the inner face of the window body arrangement and which couples light, which is emitted by the lighting unit, via a coupling surface opposite the inner face of the window body arrangement into the light-conducting layer,
wherein the light input unit is provided with at least one light-conducting means, which is disposed on a coupling side of the at least one light input element and which conducts light emitted by the lighting unit from a first light-conducting zone, which corresponds to a position of the lighting unit, to a second light-conducting zone, which is offset relative to the first light-conducting zone in the direction of the window body arrangement, and
wherein the lighting unit comprises a carrier board on which at least two light sources are disposed.

7. The vehicle window according to claim 6, wherein the carrier board is oriented at least approximately at a right angle to the window body arrangement and the light sources have a beam direction which is oriented at a right angle to the plane of the carrier board.

8. The vehicle window according to claim 1, wherein the at least one light-conducting means and the at least one light input element are made of the same plastic material.

9. The vehicle window according to claim 1, wherein the window is a roof element and configured as a displaceable lid element of a roof opening system or as a fixed roof element.

10. A vehicle roof comprising a vehicle window according to claim 1.

11. The vehicle window according to claim 6, wherein the at least two light sources are assigned to one light input element of the light input unit each.

* * * * *